Figure 9:
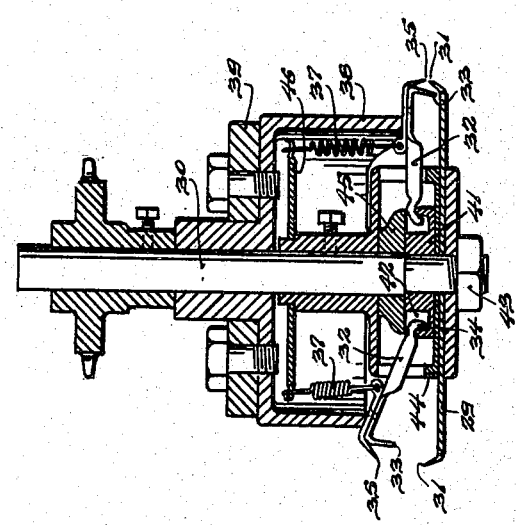

March 24, 1936.  V. BOTTKER ET AL  2,034,691
SHRIMP SHELLING MACHINE
Filed Dec. 18, 1933  3 Sheets-Sheet 1
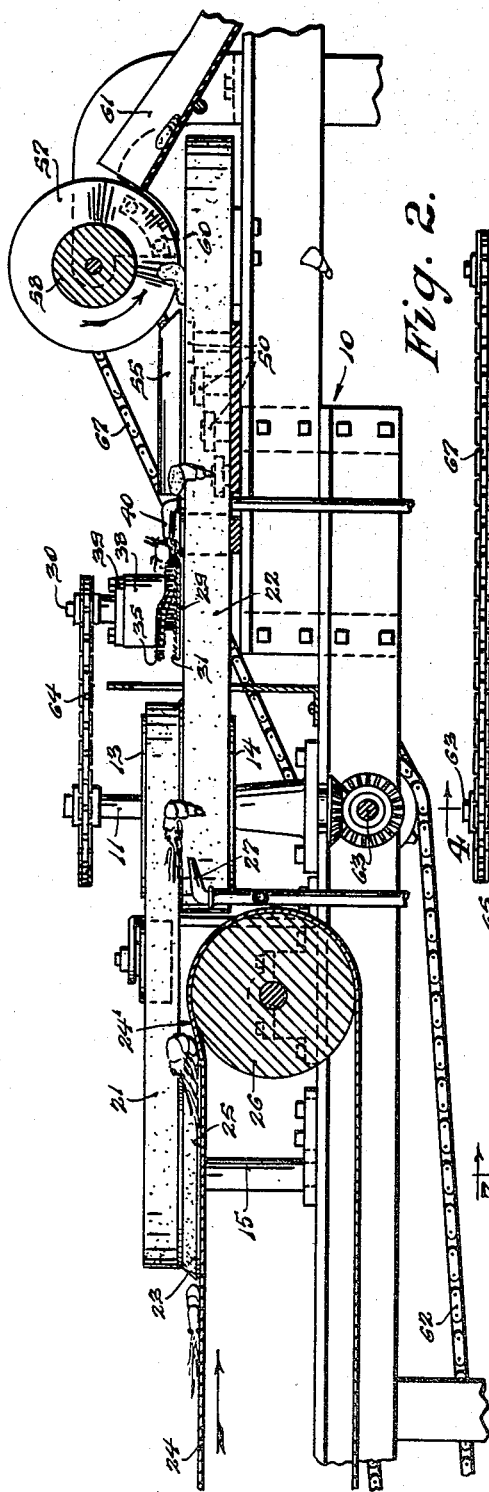
INVENTORS:
Viggo Bottker
Bjarne Grøndahl
BY
Edward ... ATTORNEY

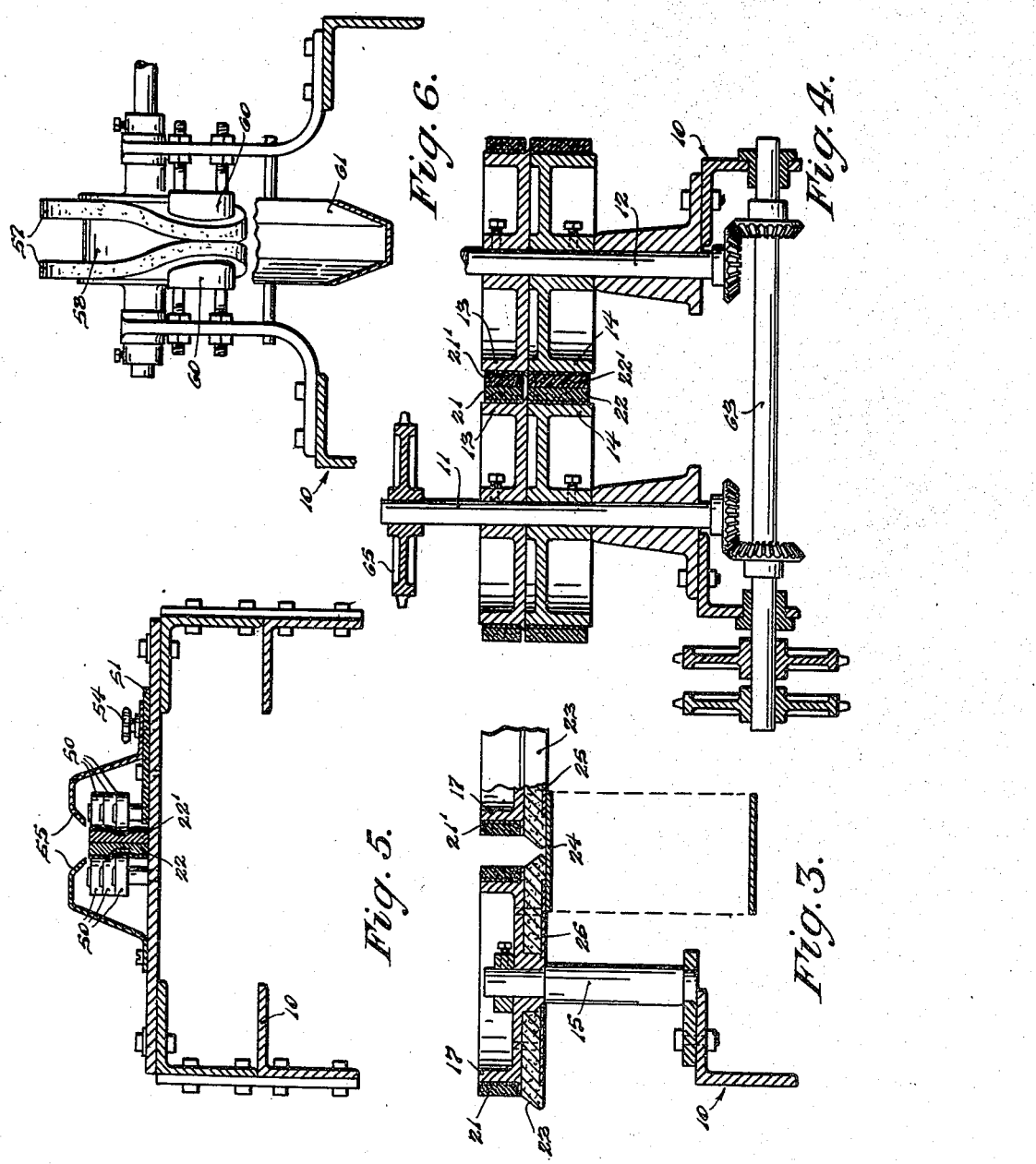

March 24, 1936.　　V. BOTTKER ET AL　　2,034,691
SHRIMP SHELLING MACHINE
Filed Dec. 18, 1933　　3 Sheets-Sheet 3

INVENTORS:
Viggo Bottker
BY Bjarne Grondahl
ATTORNEY

Patented Mar. 24, 1936

2,034,691

UNITED STATES PATENT OFFICE 2,034,691

SHRIMP-SHELLING MACHINE

Viggo Bottker and Bjarne Grondahl, Seattle, Wash., assignors to Alaskan Glacier Sea Food Company, Seattle, Wash., a corporation of Washington Application December 18, 1933, Serial No. 702,853

20 Claims. (Cl. 17—2)

Our invention relates to improved mechanism for removing the shells from shrimp and is an advance over the teaching of our issued patent numbered 1,777,069 of September 30, 1930 wherein the object primarily was that of removing the shell from the tail portion only of the shrimp. The present invention operates to remove from the shrimp the entire shell and, in the performance of such work, prevents any possibility of crushing or otherwise destroying the shrimp meat.

Specific objects and advantages of the invention will become apparent throughout the course of the following detailed description and in the claims annexed thereto.

The invention consists in the novel construction, adaptation, and combination of parts hereinafter described and claimed.

In the drawings:—

Figure 7:
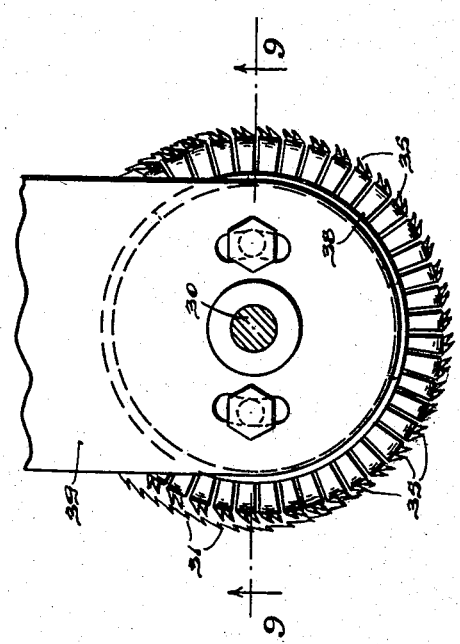
Figure 8:
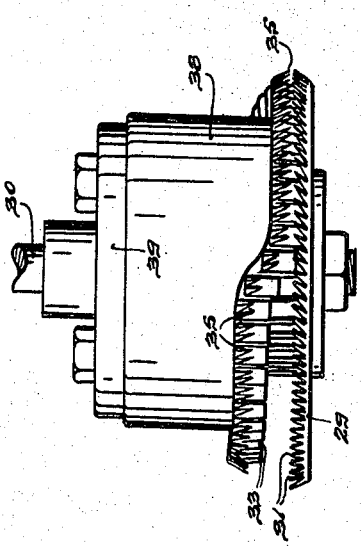

Figure 1 is a top plan view of the machine in its now preferred form, shrimp being represented in the successive steps of the machine operation thereon. Fig. 2 is a longitudinal vertical section taken on the line 2—2 of Fig. 1. Figs. 3, 4, and 5 are detail transverse vertical sections to an enlarged scale taken on the respective section lines 3—3, 4—4, and 5—5 of Fig. 1. Fig. 6 is an enlarged detail end elevation from the discharge end of the machine. Fig. 7 is a top plan view, to an enlarged scale, of the stripping mechanism shown in Figs. 1 and 2 for removing the shell from the body proper of the shrimp, the drive shaft therefor being broken away and shown in section. Fig. 8 is a side elevation of the structure disclosed in Fig. 7; and Fig. 9 is a longitudinal vertical section taken on line 9—9 of Fig. 7.

With reference being had to the drawings, the numeral 10 represents the machine frame which extends longitudinally and supports a pair of vertical shafts 11, 12 in proximity of the transverse median line thereof, said shafts being spaced equidistantly on opposite sides of the longitudinal median line of the machine and each operating to revolubly support a pair of pulleys 13, 14 superposed one above the other. At the admission end of the frame are supported a pair of transversely spaced apart vertical shafts 15, 16, each supporting a pulley 17, and at the opposite or discharge end of the frame are vertical shafts 18, 19 each supporting a pulley 20. Pulleys 17, as shown, are disposed in the horizontal plane of the pulleys 13 and operate in conjunction therewith to receive endless conveyor belts 21, 21', while the pulleys 14 and 20 operate in conjunction to receive endless conveyor belts 22, 22', said belts being of sponge rubber or other like or similar material lined on the inner or pulley-engaging surfaces with fabric tape. Pulleys 14 and 20 are disposed to contact the belts supported thereon coextensively between the transverse diametrical pulley centers with belts 21, 21' being arranged in converging relation to one another, meeting approximately on the lines of the transverse diametrical centers of the pulleys 13. We provide, about the lower edges of each of the pulleys 17, sloping skirts 23 desirably formed of yieldable sponge rubber which co-act, in a manner hereinafter described, with a delivery belt 24 the upper progressive surface of which is disposed horizontally to feed the shrimp in an upright disposition into the machine proper. Said progressive surface of belt 24 is arranged to ride under plates 25 carried on the underside of the sloping skirts 23 to slightly depress its horizontal plane of travel below the upper horizontal tangent of a drive pulley 26 therefor.

Regarding the operation of the belt 24, skirts 23, and the conveyor belts 21, 21', the shrimp are fed over the belt 24 with their heads directed rearwardly. As the shrimp contact the revolving skirts 23 the backs of the same are elevated by reason of the variation of width between the tail and the body portions of the shrimp. Advancing under the combined influence of the belt 24 and the belts 21, 21', the upwardly inclined surface 24' of belt 24 forces the shrimp upwardly between belts 21, 21', being securely gripped by the latter with the tail only of the shrimp depending below the same. Said tail, which tends to curl toward the shrimp head, is subsequently straightened to lie in a substantial vertical disposition through the instrumentality of water jets directed angularly inwardly by means of nozzles 27 from a source of pressure supply, the nozzles being located slightly in advance of the point at which the depending tails are introduced by the travel of the belts 21, 21' between the belts 22, 22'. Simultaneously with the gripping of the tail portion of the shrimp, the body portion is released from the conveyor belts 21, 21'.

Advancing longitudinally with the tail of the shrimp gripped between belts 22, 22', the upwardly projecting back is exposed for operation thereon by shell-stripping mechanism which comprises pairs of toothed members revoluble about vertical shafts 30 located at opposite sides of the line of travel of the shrimp. The lower member of the respective strippers consists in a disc 29 having the teeth 31 thereof inclined directively of the shrimp travel and extending outwardly and upwardly from the peripheral edge. The upper member comprises a plurality of radially extending vertically movable arms 32 formed to provide depending toe elements 33 at the outer ends of the same and nubs 34 at the inner ends. Extending beyond the vertical plane of said toe elements, the arms are further provided with outwardly and downwardly inclined denticulated fingers 35 which, as indicated, are projected directively of the shrimp travel. Said fingers are or may be formed separate from the arms, being integrally secured over the same and presenting an eye at the inner ends for connection with springs 37 which operate to normally maintain the arms in an elevated disposition. Said toe elements project below the protruding fingers 35 and under the influence of an annular stationary cam member 38 which is secured to the frame by plate brackets 39 are forced downwardly at a point substantially on the transverse diametrical center of the stripper to seat over the disc 29, the fingers simultaneously penetrating the shell of the shrimp body and in conjunction with the upwardly extending teeth 31 of the disc strip the shell from the shrimp as the teeth travel laterally in their revoluble movement about the axis of shafts 30. Nozzles 40 are disposed to project jets of water over the rear face of the strippers to dislodge the shell segments from the stripper teeth as the arms 32 are returned to their normal elevated dispositions under the influence of the springs 37. The toe elements described act primarily as gauge mechanism, serving to engage the surface of the shrimp shell coincident with the cam-influenced closing of the stripper teeth to force the shell inwardly from opposite sides whereby the depth of penetration of the teeth is predetermined in preventing engagement of the teeth in the shrimp meat.

In the design shown, the stationary cam members 38 serve as journal bearings for the shafts 30, each of said shafts having the disc member 29 secured to the lower end of the same. Over said disc is inserted a cup member 44, the wall of which provides a plurality of vertical radially disposed slots, and seating over the floor of the cup member is a hub block 41 formed with an annular groove 42. A nut 43 clamps the assembly against a shoulder of the shaft. Said groove 42 receives the nubs 34 with the outer wall of the same acting as a fulcrum point for the arms which are slidably received in the slots of the member 44. A cap member 45 retains the nubs against dislodgement from the groove. 46 indicates a plate revoluble with the shaft 30 for carrying the upper ends of the springs 37.

In removing the meat of the shrimp from the remaining or tail portion of the shell, the invention provides stepped series of rollers 50 at each side of the conveyor belts 22, 22' which act to compress the belts in squeezing the shell which is carried therebetween. Said rollers are arranged in transversely aligned pairs with the stepped planes rising progressively with the travel of the shrimp. As is believed obvious, expulsion of the shrimp meat occurs as the shell is fed through the successive pairs of rollers. The rollers are or may be arranged for regulation of the pressure imparted therefrom by mounting the series of rollers at one side of the belts on a laterally adjustable plate 51, said plate being slotted as at 52 for limited slide activity over screws 53. A thumb set screw is indicated at 54. Trough-forming walls 55 are provided at opposite sides of the belts overlying the rollers 50 to support the shrimp meat which is freed from the shell.

It is with the object of separating the meat of the shrimp from the shell which has been removed therefrom that we provide, at the discharge end of the machine above the belts 22, 22', a pair of rubber discs 57 revoluble about a transverse horizontal axis. Said discs are separated by a spacer 58 and compressed at the base portions thereof by means of stationary cam arms 60 to produce a V-groove into which the meat is deposited from the belts. Travel of the meat upwardly in the groove deposits the same into a discharge chute 61, the tail portion of the shrimp shell dropping from the belts as the same pass about the pulleys 20.

The system of drive for the machine comprises a chain 62 from a source of power (not shown) to a horizontal shaft 63. Bevel gears transmit revoluble movement from shaft 63 to shafts 11, 12 and chains 64 from sprocket wheels 65 on the shafts 11, 12 revolve sprocket wheels carried by the shafts 30 of the strippers.

A chain 67 imparts direct drive from the shaft 63 to the discs 57.

The successive steps of removing the shrimp shell are believed clear from the foregoing.

Our disclosure obviously permits of numerous modifications within the spirit of the invention and we limit ourselves only as by the scope of the hereto annexed claims.

What we claim is:—

1. In a shrimp-shelling machine, shrimp tail-gripping devices, shrimp body-gripping devices located in a plane offset from that of the tail-gripping devices, means for introducing the body of the shrimp between the body-gripping devices with the tail protruding therefrom into the plane of the tail-gripping devices, and means for straightening the tail for introducing the same in an upright position to the tail-gripping devices.

2. In a shrimp-shelling machine, shrimp body-gripping devices, delivery structure disposed below the plane of said body-gripping devices, and means between said delivery structure and the body-gripping devices for tilting the shrimp to locate the body of the same in the plane of the body-gripping devices.

3. In a shrimp-shelling machine, shrimp carrier devices, means for introducing the shrimp to said carrier devices, and means located in the path of travel of the shrimp with the carrier devices for removing the shell from the anterior portion of the shrimp.

4. In a shrimp-shelling machine, a shrimp carrier, means for introducing the shrimp to said carrier, devices mounted in the path of travel of the shrimp with the carrier for penetrating the shell of the shrimp, and means for stripping the shell penetrated by said devices from the shrimp.

5. In a shrimp-shelling machine, a shrimp carrier, means for introducing the shrimp to said carrier, and means operating in response to the travel of the shrimp with the carrier for removing the shell from the body and the tail portions of the shrimp.

6. In a shrimp-shelling machine, carrier mechanism comprising companion endless belts of a cushion material operating in side by side relation, and means for introducing the shrimp to the space between said belts for gripping the same thereby.

7. In a shrimp-shelling machine, a pair of laterally spaced apart devices each of which are provided with opposing teeth, means for imparting progressive travel of the shrimp through the space between said devices, means for imparting closing movements to the opposing teeth over the shell of the shrimp co-incident with the admission of the shrimp between said devices for penetrating the shell of the shrimp, and means for actuating said teeth to strip the shell from the shrimp responsive to the travel of the shrimp past said devices.

8. In a shrimp-shelling machine, in combination, laterally spaced apart series of stepped rollers operative to squeeze the tail portion of a shrimp shell fed therebetween successively from the tip of the tail toward the body portion of the shrimp to force the meat of the shrimp from the tail shell, and means for progressively feeding a shrimp through the space between said series of rollers.

9. In a shrimp-shelling machine, a pair of carrier devices arranged for movement longitudinally of the machine and co-acting to grip the shrimp between the same, and means comprising pressure mechanism disposed at opposite sides of the carriers and operating to progressively compress the carriers from one to the other edge of the same responsive to the travel of the carriers for squeezing the shrimp gripped therebetween to force the meat of the shrimp from the shell of the same.

10. In a shrimp-shelling machine, endless conveyor belts operating in side by side relation to grip the tail portion of the shrimp therebetween, series of stepped rollers at opposite sides of the belts operating to progressively compress the belts from one to the other edge of the same to force the meat from the tail portion of the shrimp responsive to the travel of the shrimp past the rollers, a discharge chute for the shelled meat of the shrimp, and means for delivering the shelled meat to said discharge chute.

11. In a shrimp-shelling machine, pressure mechanism operative to squeeze the shell of the shrimp from the tip of the tail toward the body portion of the shrimp to force the meat of the tail from the shrimp shell.

12. In a shrimp-shelling machine, shrimp tail-gripping devices arranged for movement longitudinally of the machine, means for effecting said longitudinal movement, means for delivering shrimp successively to said tail-gripping devices, rotary disc members located at opposite sides of the line of travel of the shrimp with the tail-gripping devices provided about the peripheries of the same with upwardly extending teeth, said teeth projecting into the path of travel of the shrimp, a plurality of fingers extending radially from the centers of rotation of the disc members above the disc members and provided with teeth in the outer ends of the same oppositionally disposed to the teeth of the disc members, means for imparting rotary movement to the fingers collectively with the disc members about the axes of the disc members, and means operating in response to said collective rotary movement of the fingers and the disc members for imparting relative closing and opening movements between the teeth of the fingers and the disc members for successively penetrating the shell about the body portion of the shrimp, stripping the shell from the body portion of the shrimp, and disdodging the shell from between the teeth.

13. In a shrimp-shelling machine, the combination with tail-gripping carrier devices, means for imparting movement thereto, and means for introducing the tail portion of shrimp between said tail-gripping carrier devices with the body portion of the shrimp extending above the same, means operating in response to the travel of the shrimp with the tail-gripping carrier devices for removing the shell from the body portion of the shrimp, and means operating subsequent to the removal of the shell from the body of the shrimp responsive to the progressive travel of the shrimp with the tail-gripping carrier devices for separating the shrimp meat from the gripped tail shell of the same.

14. In a shrimp-shelling machine, the combination with a pair of endless conveyor belts disposed in side by side relation and formed of a cushion material to grip the tail of the shrimp therebetween, and means for introducing the tail portion of a shrimp between said belts with the body portion being exposed above the same, means operating in response to the travel of the shrimp with the conveyor belts for stripping the shell from the exposed body portion of the shrimp, and means operating subsequent to the removal of the shell from the body portion of the shrimp responsive to the progressive travel of the shrimp with the conveyor belts for forcing the meat of the shrimp from the gripped tail shell of the same.

15. In the shelling of shrimp, the method of straightening the normally curved tail portion of the same to have the tail lie in an extended disposition which consists in directing a pressure jet from a source of pressure supply against the tail portion.

16. In a shrimp-shelling machine comprising carrier devices provided with means for gripping the shrimp, and means operating in responce to the travel of the shrimp with the carrier devices for forcing the meat of the shrimp from the shell gripped by the carrier devices, means for delivering from the machine the meat forced from the shell separate from the gripped shell comprising a discharge chute the admission end of which is located in a plane above that of the carrier devices, and means operating to elevate the shrimp meat from the plane of the carrier devices and deliver the same to said admission end of the chute.

17. In a machine for handling shrimp or other like or similar work having an endless conveyor for supplying the work to the machine, the delivery surface of said conveyor being disposed horizontally or approximately so, gripping devices for the work extending from the delivery end of the conveyor and comprising a pair of endless belts disposed in side by side relation on a common horizontal plane, and means operating to form, in end elevation, a relative V-shaped trough disposed in a vertical plane medially between the belts for tilting the work delivered from the conveyor to position the same vertically in locating the work for gripping engagement between the belts.

18. In a shrimp-shelling machine, devices operating to engage the anterior portion of the shrimp to expose the posterior or tail portion, devices operating to engage said tail portion of the shrimp to expose the anterior portion, and means operating to introduce the shrimp to said devices successively.

19. In a machine for shelling shrimp, means for removing the shell from the anterior or head and thorax portion of the shrimp and from the posterior or tail portion of the shrimp, and feed devices operating to deliver the shrimp to said shelling means.

20. In a machine for shelling shrimp, means for removing the anterior shell from the body of the shrimp, and feed devices operating to deliver the shrimp to said shelling means.

VIGGO BOTTKER.
BJARNE GRONDAHL.